D. P. DAVIS.

Recording Steam-Gages.

No. 5,252. Reissued Jan. 21, 1873.

Witnesses,

Chas. A. Snuck

Geo. D. Walker

Inventor

David P. Davis

Lemuel W. Ferrell atty.

UNITED STATES PATENT OFFICE.

DAVID P. DAVIS, OF JERSEY CITY, NEW JERSEY, ASSIGNOR OF ONE-HALF INTEREST TO GILBERT J. HUNTER.

IMPROVEMENT IN RECORDING STEAM-GAGES.

Specification forming part of Letters Patent No. 66,307, dated July 2, 1867; reissue No. 5,252, dated January 21, 1873.

*To all whom it may concern:*

Be it known that I, DAVID P. DAVIS, of Jersey City, in the county of Hudson and State of New Jersey, have invented a new and Improved Indicator; and that the following is a full and correct specification of the same.

The present invention relates to an indicator more particularly intended for use in connection with steam-boilers, although it can be applied to other purposes; and the invention consists in the application to or the combination with any ordinarily-constructed or other suitable pressure-gage having an indicating-hand, of a dial or disk of any suitable material for receiving and retaining marks or indentations, which disk is moved in such a manner as to be marked by a pencil, or any other suitable marking device, arranged to operate in connection with the said pressure-gage, and to be thus moved, according to the pressure thereon, over the surface of the said disk, either in a straight or in a curved line, as may be found necessary.

With a combination of parts such as above described, if the dial or disk be properly graduated or marked off—as, for instance, divided from its center outward in radial lines into twelve parts to indicate the twelve hours of the day from 12 m. to 12 midnight, and in a series of concentric circles at equal distances apart, and marked off from the outer to the inner, commencing with 10 and ending at 60, in the order of tens, and then such disk be arranged to revolve by clock-work once in twelve hours, and in such manner and connection with the marking device that said marking device, as the pressure of steam within the boiler increases or decreases, will move over the said revolving graduated disk in a radial line or direction thereto from its outer edge toward its center—it is plain that if the graduations of the disk and its movement in connection with that of the marker are properly adjusted, a complete diagram or record, as it were, of the steam pressure upon the boiler, at every portion of the twelve hours, will be marked upon the graduated disk or dial, which by its graduations can be freely read and interpreted, as they act as guides thereto.

Figure 1:
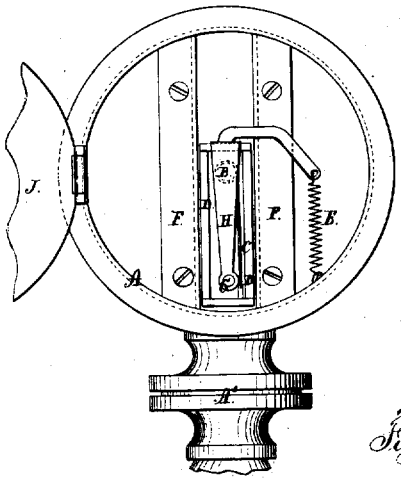
Figure 2:
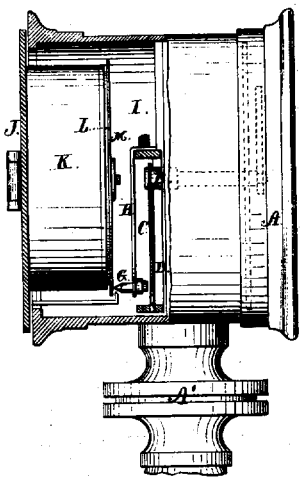

In the drawing, Figure 1 is an interior view of a pressure-gage upon its rear side or back of the ordinary dial-face thereto to show arrangement of marker; Fig. 2, a partial vertical section through case to pressure-gage, and also side elevation of the same; and Fig. 3, a face view of the graduated dial or disk, or what might be termed the indicator-card for the pressure-gage, but on a somewhat enlarged scale.

Figure 3:
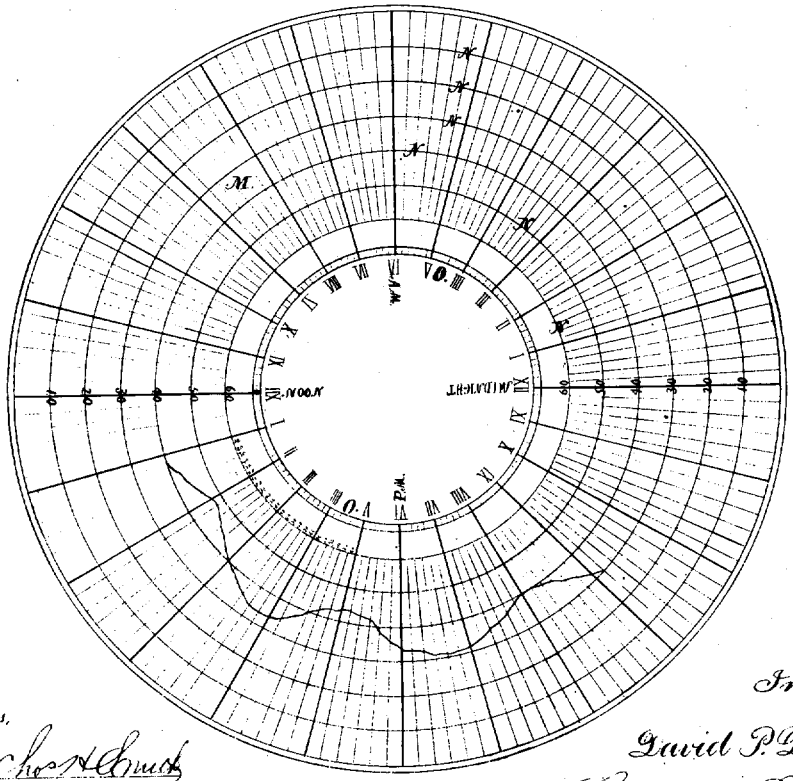

A, in the drawing, represents the case or box to a steam-pressure gage, which may be of any of the ordinary forms or constructions and arrangements of parts suitable for indicating the pressure of steam per square inch upon the boiler through and by means of a suitable dial-face and index-hand or pointer acted upon by a diaphragm at A′, as in the common steam-gages; B, the center or arbor for index-hand or pointer to the pressure-gage; and C, a cord secured to inner or rear end of such arbor, around or from which, as it turns by the action of the steam pressure, the cord winds or unwinds, as the case may be, thus causing a frame or slide, D, to raise or lower accordingly. To this frame D the said cord C is fastened, and to withdraw it as the cord unwinds a spring, E, is suitably arranged and connected with the same therefor. This frame D is shown as moving in and between suitable guide-stops F applied to the back of the pressure-gage, and by it is carried a marker or pointer, G, that is hung or attached thereto by a spring-arm, H. This marker G projects toward the indicator-card. A chamber, I, in boxing A of gage, back of the dial-face, in which chamber and attached to the hinged rear side or plate J is a watch or clock movement, K; L, a disk or plate, connected in any proper manner to the actuating mechanism or clock, so as to be turned or moved thereby in and during the space of twelve, twenty-four, or any other number of hours or other divisions of time, according as may be desired. To this plate or disk L another disk or card, M, is attached so as to move therewith and in such a manner as to be attached and detached when so desired. This disk or card M is shown in Fig. 3, and upon its face is marked off with a series of concentric circular lines, N, from its outer edge toward its center, and at regular and equal distances apart, with each circle from the outer edge to its center marked in the order of tens regularly, and with a series of radial lines at equal and regular distances apart, dividing the said disk-face into the desired parts. These radial lines on the face of the disk L may be marked at their inner ends around the inner circular line O in a similar manner to the dial-face of a watch—that is, with Roman figures from I to XII inclusive, in two series, one after the other, representing the twenty-four hours of the day, and suitably marked for noon, midnight, &c. The radial division-lines of the disk or card M represent the hours of the day, and the concentric circular lines the steam pressure, the spaces between the several radial lines being subdivided so as to enable the fractional parts of time to be better read or indicated.

With a disk or card, M, marked off or graduated, and a marker, G, connected with the pressure-gage so as to move therewith as the steam pressure increases or decreases, by so locating the said card and the said marker that the latter will always bear upon the former as it moves, and so that the said marker moves over the disk, its point of location thereon will always be at such a marked graduation as corresponds in number to the steam pressure within the boiler and as indicated by the pressure-gage. It is plainly obvious that by the marker the said graduated card M as it moves will be marked in a continuous line, but either more or less crooked according as the marker is moved more or less across the face of the card by the variation of the steam pressure within the boiler, a diagram or line of such a character being represented in Fig. 3 as an illustration thereof.

By means of a diagram-card and marker arranged together as above described a complete and perfect record of the steam pressure within the boiler will be made, and one which enables the pressure at any moment during the time allotted to be ascertained, as, for instance, in Fig. 3 the card shows that at one o'clock p. m. the pressure was forty pounds; at two o'clock p. m. between forty and fifty pounds; at three o'clock, forty pounds, and so on, from hour to hour.

I am aware that instruments have been made in which the pressure of steam operates a pencil or marker and causes a record upon a moving card or paper. In other instances a diaphragm or a piston has been employed to move a hand to indicate the pressure by inspection. It is important that the pressure should be indicated by a hand and dial, and also that a record should be simultaneously made. I have combined the recording mechanism with the indicator-hand in one instrument; therefore

I claim as my invention—

The indicating-hand and dial, the marker and moving recording-surface, in combination with the actuating diaphragm, substantially as specified, whereby the hand and marker are simultaneously actuated by the pressure, substantially as set forth.

Signed by me this 24th day of April, A. D. 1872.

DAVID P. DAVIS.

Witnesses:
GEO. T. PINCKNEY,
CHAS. H. SMITH.